United States Patent [19]

Brinkerhoff

[11] 3,784,748
[45] Jan. 8, 1974

[54] AUTOMOTIVE VEHICLE SOUND DISTRIBUTION SYSTEM

[75] Inventor: Donald E. Brinkerhoff, Kokomo, Ind.

[73] Assignee: General Motors Corporation, Detroit, Mich.

[22] Filed: Jan. 19, 1972

[21] Appl. No.: 218,975

[52] U.S. Cl. ............................ 179/1 VE, 179/1 VL
[51] Int. Cl. ............................................. H04r 5/02
[58] Field of Search ................ 179/1 VE, 1 VL, 1 B

[56] References Cited
UNITED STATES PATENTS

| | | | |
|---|---|---|---|
| 3,668,323 | 6/1972 | Lee et al. ........................ | 179/1 VE |
| 2,573,122 | 10/1951 | Weber .............................. | 179/1 VL |
| 3,033,930 | 5/1962 | Guzskie et al. .................... | 179/1 VL |

Primary Examiner—Kathleen H. Claffy
Assistant Examiner—Douglas W. Olms
Attorney—E. W. Christen et al.

[57] ABSTRACT

In a sound distribution system for an automotive vehicle, a relay is manually operable to shift control over the sound level of a rear seat speaker from a front seat fader exclusively to a rear seat fader exclusively. Further, a limiting resistor is connected to the rear seat fader to prohibit unloading of the audio signal source of the sound distribution system.

1 Claim, 1 Drawing Figure

PATENTED JAN 8 1974  3,784,748
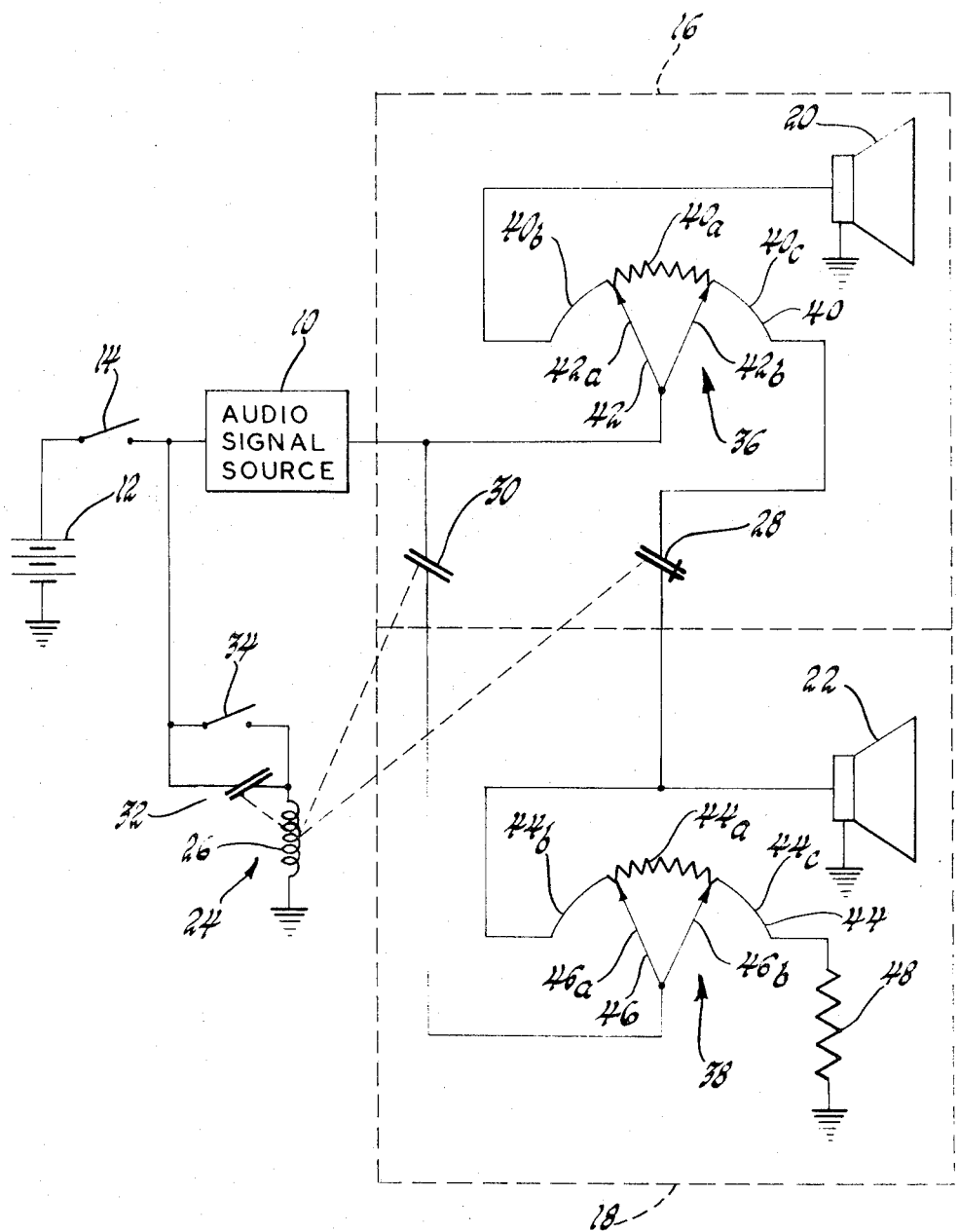

AUTOMOTIVE VEHICLE SOUND DISTRIBUTION SYSTEM

This invention relates to a sound entertainment system for an automotive vehicle. More particularly, the invention relates to an automotive vehicle sound distribution system including a front seat speaker for servicing a front seat passenger area and a rear seat speaker for servicing a rear seat passenger area.

According to one aspect of the invention, control over the sound level of the front seat speaker resides with a front seat fader exclusively while control over the sound level of the rear seat speaker is selectively transferable from the front seat fader exclusively to a rear seat fader exclusively.

In another aspect of the invention, a relay effectively connects the rear seat speaker to the front seat fader when the relay is manually deenergized from the front seat passenger area and effectively connects the rear seat speaker to the rear seat fader when the relay is manually energized from the rear seat passenger area.

As contemplated by a further aspect of the invention, the relay includes first and second sets of switching contacts. The first set of contacts are opened when the relay is energized and are closed when the relay is deenergized to connect the front seat fader to the rear seat speaker. The second set of contacts are opened when the relay is deenergized and are closed when the relay is energized to connect the rear seat fader to the audio signal source of the sound distribution system.

According to another aspect of the invention, the front seat fader and the rear seat fader each comprise first and second relatively movable members. The first relatively movable member includes a resistor portion connected between first and second conductor portions all of approximately equal length. The second relatively movable member includes first and second wipers mounted to engage or contact the first relatively movable member at points spaced apart by a distance approximately equal to the length of one of the resistor and conductor portions of the first relatively movable member.

In a further aspect of the invention, the first conductor portion of the front seat fader is connected to the front seat speaker while the second conductive portion of the front seat fader is connected through the first set of switching contacts to the rear seat speaker. In addition, the first and second wipers of the front seat fader are connected to the audio signal source. Hence, the first and second wipers are relatively movable toward the second conductive portion of the front seat fader to fade the sound level of the front seat speaker. Conversely, the first and second wipers are relatively movable toward the first conductive portion of the front seat fader to fade the sound level of the rear seat speaker, provided that the relay is deenergized so that the first set of switching contacts are closed.

As contemplated by yet another aspect of the invention, the first conductor portion of the rear seat fader is connected to the rear seat speaker while the first and second wipers of the rear seat fader are connected through the second set of switching contacts to the audio signal source. Thus, the first and second wipers are relatively movable toward the second conductor portion of the rear seat fader to fade the sound level of the rear seat speaker, provided that the relay is energized so that the second set of contacts are closed.

In a still further aspect of the invention, a limiting resistor is connected between the second conductor portion of the rear seat fader and the system ground to prohibit unloading of the audio signal source when the relay is in an actuated condition and the front and rear seat faders are both in a maximum resistive condition.

These and other aspects and advantages of the invention will become more apparent by reference to the following detailed description of a preferred embodiment when considered in conjunction with the accompanying drawing. In the drawing, the sole FIGURE is a schematic diagram of an automotive vehicle sound entertainment system incorporating the principles of the invention.

Referring to the drawing, a sound entertainment system for an automotive vehicle includes an audio signal source 10 which may take the form of a radio receiver, a tape player, a phonograph player or any other appropriate audio signal generator. The audio signal source 10 is connected to a power supply 12 through a manually operable audio control switch 14. Conveniently, the power supply 12 may be provided by the vehicle battery. The audio signal source 10 is energized when the audio control switch 14 is closed and is deenergized when the audio control switch 14 is opened.

The automotive vehicle includes a front seat passenger area 16 and a rear seat passenger area 18. A first or front seat speaker 20 services the front seat passenger area 16. A second or rear seat speaker 22 services the rear seat passenger area 18. That is, the first and second speakers 20 and 22 convert audio electrical signals received from the audio signal source 10 into audio acoustical signals which are projected into the front and rear seat passenger areas 16 and 18, respectively. The overall sound level of the first and second speakers 20 and 22 is regulated in a manner which will now be described.

A switching device or control relay 24 includes a coil 26 which operates a first or normally closed set of switching contacts 28, a second or normally opened set of switching contacts 30 and a third or normally opened set of holding contacts 32. The coil 26 is connected to the power supply 12 through a relay control switch 34 and through the audio control switch 14. The third or normally opened set of holding contacts 32 is connected across the relay control switch 34.

A first or front seat fader 36 is located in the front seat passenger area 16 while a second or rear seat fader 38 is located in the rear seat passenger area 18. The front seat fader 36 includes a stationary member 40 and a movable member 42. The stationary member 40 includes a resistor portion $40_a$ connected between a first conductor portion $40_b$ and a second conductor portion $40_c$. The resistor and conductor portions $40_a$, $40_b$ and $40_c$ of the stationary member 40 are all of approximately equal length. The movable member 42 includes a first wiper $42_a$ and a second wiper $42_b$ which are fixedly mounted with respect to each other and which are pivotally mounted with respect to a common pivot point so that the wipers $42_a$ and $42_b$ move in unison. Specifically, the first and second wipers $42_a$ and $42_b$ are relatively mounted at an angle selected such that the wipers $42_a$ and $42_b$ electrically and mechanically contact or engage the stationary member 40 at points spaced apart by a distance approximately equal to the length of one of the resistor and conductor portions $40_a$, $40_b$ and $40_c$ of the stationary member 40.

Similarly, the rear seat fader 38 includes a stationary member 44 and a movable member 46. The stationary member 44 includes a resistor portion $44_a$ connected between a first conductor portion $44_b$ and a second conductor portion $44_c$. The resistor and conductor portions $44_a$, $44_b$ and $44_c$ of the stationary member 44 are all of approximately equal length. The movable member 46 includes a first wiper $46_a$ and a second wiper $46_b$ which are fixedly mounted with respect to each other and which are pivotally mounted with respect to a common pivot point so that the wipers $46_a$ and $46_b$ move in unison. In particular, the first and second wipers $46_a$ and $46_b$ are relatively mounted at an angle selected such that the wipers $46_a$ and $46_b$ electrically and mechanically contact or engage the stationary member 44 at points spaced apart by a distance approximately equal to the length of one of the resistor and conductor portions $44_a$, $44_b$ and $44_c$ of the stationary member 44.

The first conductor portion $40_b$ of the front seat fader 36 is connected directly to the front seat speaker 20. The second conductor portion $40_c$ of the front seat fader 36 is connected through the first or normally closed set of switching contacts 28 to the rear seat speaker 22. The first and second wipers $42_a$ and $42_b$ of the front seat fader 36 are both connected to the audio signal source 10. The first conductor portion of the rear seat fader 38 is connected directly to the rear seat speaker 22. The second conductor portion $44_c$ of the rear seat fader 38 is connected through a limiting resistor 48 to ground. The first and second wipers $46_a$ and $46_b$ of the rear seat fader 38 are both connected through the second or normally opened set of switching contacts 30 to the audio signal source 10.

When the audio control switch 14 is closed, the audio signal source 10 is energized to produce audio electrical signals having a nominal magnitude determined by the volume control (not shown) of the audio signal source 10. The front seat fader 36 is manually operable from the front seat passenger area 16 to exclusively control the overall sound level of the front seat speaker 20 at all times. When the first wiper $42_a$ is in contact with the first conductor portion $40_b$, substantially none of the resistor portion $40_a$ is effectively connected between the audio signal source 10 and the front seat speaker 20 so that the overall sound level of the speaker 20 is at a maximum. As the first wiper $42_a$ is pivoted from the first conductor portion $40_b$ across the resistor portion $40_a$ toward the second conductor portion $40_c$, an increasing amount of the resistor portion $40_a$ is effectively connected between the audio signal source 10 and the front seat speaker 20 thereby to lower or fade the overall sound level of the speaker 20. When the first wiper $42_a$ is in contact with the second conductor portion $40_c$, substantially all of the resistor portion $40_a$ is effectively connected between the audio signal source 10 and the front seat speaker 20 so that the overall sound level of the speaker 20 is at a minimum.

Normally, the relay control switch 34 is opened so that the coil 26 is deenergized to place the relay 24 in a deactuated or deenergized condition. In the deactuated condition, the first set of switching contacts 28 is closed and the second set of switching contacts 30 is opened. As a result, the front seat fader 36 also exclusively regulates the overall sound level of the rear seat speaker 22 through the first set of switching contacts 28. When the wiper $42_b$ is in contact with the second conductor portion $40_c$, substantially none of the resistor portion $40_a$ is effectively connected between the audio signal source 10 and the rear seat speaker 22 so that the overall sound level of the speaker 22 is at a maximum. As the second wiper $42_b$ is pivoted from the second conductor portion $40_c$ across the resistor portion $40_a$ toward the first conductor portion $40_b$, an increasing amount of the resistor portion $40_a$ is effectively connected between the audio signal source 10 and the rear seat speaker 22 thereby to lower or fade the overall sound level of the speaker 22. When the second wiper $42_b$ is in contact with the first conductor portion $40_b$, substantially all of the resistor portion $40_a$ is effectively connected between the audio signal source 10 and the rear seat speaker 22 so that the overall sound level of the speaker 22 is at a minimum.

When the relay control switch 34 is closed, the coil 26 is energized to place the relay 24 in the actuated or energized condition. In the actuated condition, the first set of switching contacts 28 is opened and the second set of switching contacts 30 is closed. As a result, the rear seat fader 38 exclusively regulates the overall sound level of the rear seat speaker 22 from the rear seat passenger area 18. When the first wiper $46_a$ is in contact with the first conductor portion $44_b$, substantially none of the resistor portion $44_a$ is effectively connected between the audio signal source 10 and the rear seat speaker 22 so that the overall sound level of the speaker 22 is at a maximum. As the first wiper $46_a$ is pivoted from the first conductor portion $44_b$ across the resistor portion $44_a$ toward the second conductor portion $44_c$, an increasing amount of the resistor portion $44_a$ is effectively connected between the audio signal source 10 and the rear seat speaker 22 thereby to lower or fade the overall sound level of the speaker 22. When the first wiper $46_a$ is in contact with the second conductor portion $44_c$, substantially all of the resistor portion $44_a$ is effectively connected between the audio signal source 10 and the rear seat speaker 22 so that the overall sound level of the speaker 22 is at a minimum.

Further, when the coil 26 is energized to place the relay 24 in the actuated condition, the third or normally open set of holding contacts 32 is closed. Consequently, the coil 26 remains energized through the set of holding contacts 32 even though the relay control switch 34 is subsequently opened. Preferably, the relay control switch 34 is manually operable from the rear seat passenger area 18. The rear seat fader 38 may be overridden by opening the audio control switch 14 thereby deenergizing not only the audio signal source 10 but also deenergizing the coil 26 to place the relay 24 in the deactuated condition. Preferably, the audio control switch 14 is manually operable from the front seat passenger area 16. Therefore, primary control over the illustrated automotive vehicle sound entertainment system resides with the vehicle operator in the front seat passenger area 16.

In an automotive vehicle sound distribution system constructed in accordance with the illustrated embodiment of the invention, the following component values were found to yield satisfactory results:

| | |
|---|---|
| Battery 12 | 12 Volts |
| Speaker 20 | 10 OHMS |
| Speaker 22 | 10 OHMS |
| Resistor $40_a$ | 100 OHMS |
| Resistor $44_a$ | 100 OHMS |
| Resistor 48 | 10 OHMS |

The resistor 48 prohibits unloading of the audio signal source 10 when the relay 24 is energized. When the second set of switching contacts 30 are closed and the first and second wipers $46_a$ and $46_b$ are in contact with the second conductor portion $44_c$, the rear seat fader is in a maximum resistive condition of approximately 100 ohms. Moreover, when the switching contacts 28 are opened and the first and second wipers $42_a$ and $42_b$ are both in contact with the second conductor portion $40_c$, the front seat fader 36 is also in a maximum resistive condition of approximately 100 ohms. Were it not for the limiting resistor 48, the overall load on the audio signal source would be approximately 40 ohms. Such a high load resistance could damage the internal components of the audio signal source. However, with the limiting resistor 48 effectively connected in parallel with the front seat fader 36 and the rear seat fader 38, the resultant load on the audio signal source is restricted to approximately 10 ohms. Since the load presented by each of the first and second speakers 20 and 22 is also 10 ohms, there is no normal operating condition of the illustrated sound distribution system in which the audio signal source 10 is subjected to an overall load of greater than approximately 10 ohms. When the relay 24 is in a deactuated condition, either the speaker 20 or the speaker 22 is always directly connected to the audio signal source 10 to keep the resultant load on the audio signal source 10 from exceeding approximately 10 ohms.

It will now be understood that the previously described embodiment of the invention is shown for illustrative purposes only and that various alterations and modifications may be made to the preferred embodiment without departing from the spirit and scope of the invention. Thus, the inventive automotive sound distribution system is not limited to a two speaker monophonic system, but may be readily adapted to a four or more speaker stereophonic system by appropriately duplicating the depicted control circuitry.

I claim:

1. A sound distribution system for an automotive vehicle having front seat and rear seat passenger areas, comprising: an audio signal source; first and second grounded speakers each having the same given resistance for servicing the front seat and rear seat passenger areas, respectively; switching means manually operable between a deactuated condition and an actuated condition, the switching means having a first set of contacts which are closed in the deactuated condition and which are opened in the actuated condition, the switching means having a second set of contacts which are opened in the deactuated condition and which are closed in the actuated condition; a first fader including first and second relatively movable members, the first member including a resistor portion having first and second ends, the second member including first and second wipers mounted for contacting with the resistor portion of the first member, the first end of the resistor portion connected to the second speaker indirectly through the first set of contacts, the first and second wipers connected to the audio signal source directly, the first and second movable members of the first fader manually operable from the front seat passenger area to move the first wiper across the resistor portion toward the second end to increase the resistance presented between the first speaker and the audio signal source thereby to fade the overall sound level of the first speaker and to move the second wiper across the resistor toward the first end to increase the resistance presented between the second speaker and the audio signal source thereby to fade the overall sound level of the second speaker when the switching means is in the deactuated condition; a second fader including first and second relatively movable members, the first member including a resistor portion having first and second ends, the second member including a wiper mounted for contacting with the resistor portion of the first member, the first end of the resistor portion connected to the second speaker directly, the wiper connected to the audio signal source indirectly through the second set of contacts, the first and second members of the second fader manually operable from the rear seat passenger area to move the wiper over the resistor toward the second end to increase the effective resistance presented between the second speaker and the audio signal source thereby to fade the overall sound level of the second speaker when the switching means is in the actuated condition; and a grounded resistor having the same given resistance as the first and second speakers connected to the second end of the resistor portion of the second fader such that the given resistance represents the maximum load to which the audio signal source is subjected regardless of the operation of the first and second faders.

* * * * *